(12) United States Patent
Gouge et al.

(10) Patent No.: US 7,962,908 B2
(45) Date of Patent: *Jun. 14, 2011

(54) SYSTEM AND METHOD FOR IMPORTING A CONFIGURED DATA SET INTO A TARGET SET

(75) Inventors: Christopher S. Gouge, Bellevue, WA (US); James S. Masson, Bothell, WA (US); Theodore C. VanZwol, Kirkland, WA (US); Michael James Day, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1105 days.
This patent is subject to a terminal disclaimer.

(21) Appl. No.: 11/696,454

(22) Filed: Apr. 4, 2007

(65) Prior Publication Data

US 2007/0288918 A1  Dec. 13, 2007

Related U.S. Application Data

(63) Continuation of application No. 09/770,705, filed on Jan. 26, 2001, now Pat. No. 7,219,332.

(60) Provisional application No. 60/216,720, filed on Jul. 7, 2000.

(51) Int. Cl.
*G06F 9/45* (2006.01)
(52) U.S. Cl. ...................................... 717/174
(58) Field of Classification Search ................... 717/174
See application file for complete search history.

(56) References Cited

U.S. PATENT DOCUMENTS

| | | | |
|---|---|---|---|
| 4,558,413 A | 12/1985 | Schmidt et al. | |
| 4,809,170 A | 2/1989 | Leblang et al. | |
| 5,421,016 A | 5/1995 | Conner et al. | |
| 5,634,114 A | 5/1997 | Shipley | |
| 5,649,200 A | 7/1997 | Leblang et al. | |
| 5,682,536 A | 10/1997 | Atkinson et al. | |
| 5,787,280 A | 7/1998 | Joseph et al. | |
| 5,862,386 A | 1/1999 | Joseph et al. | |
| 5,898,875 A | 4/1999 | Nakamura et al. | |
| 5,933,647 A | 8/1999 | Aronberg et al. | |
| 6,003,095 A | 12/1999 | Pekowski et al. | |
| 6,009,274 A | 12/1999 | Fletcher et al. | |
| 6,035,121 A | 3/2000 | Chiu et al. | |
| 6,072,950 A | 6/2000 | Steensgaard | |

(Continued)

OTHER PUBLICATIONS

Template Software Corporation, Using the SNAP Development Environment. SNAP version 8.0, 1998, Chapters 1-4.

(Continued)

*Primary Examiner* — John Chavis
(74) *Attorney, Agent, or Firm* — Woekman Nydegger

(57) ABSTRACT

A system and method are disclosed for creating and describing a configurable data set, configuring the data set and merging a resulting configured data set into a target data set. One or more configurable data elements are stored in a configurable data set that forms part of a configurable merge module. The configurable merge module also includes metadata concerning the configurable data. The metadata describes the data elements and how they can be configured and how to implement changes to the configurable data. Each configurable data element can be presented to the configurable merge module consumer through a user interface. The configurable merge module consumer can thus make configuration choices. Also provided is a transformation engine for customizing the configurable data based on configurable merge module consumer choices and a merge engine for inserting configured data into a target data set.

18 Claims, 10 Drawing Sheets

U.S. PATENT DOCUMENTS

| | | | |
|---|---|---|---|
| 6,112,168 A | 8/2000 | Corston et al. | |
| 6,154,876 A | 11/2000 | Haley et al. | |
| 6,182,279 B1 | 1/2001 | Buxton | |
| 6,192,518 B1 | 2/2001 | Neal | |
| 6,212,673 B1 | 4/2001 | House et al. | |
| 6,256,773 B1 | 7/2001 | Bowman-Amuah | |
| 6,263,492 B1 | 7/2001 | Fraley et al. | |
| 6,327,705 B1 | 12/2001 | Larsson et al. | |
| 6,334,213 B1 | 12/2001 | Li | |
| 6,347,398 B1 | 2/2002 | Parthasarathy et al. | |
| 6,378,127 B1 | 4/2002 | Delo | |
| 6,381,735 B1 | 4/2002 | Hunt | |
| 6,381,742 B2 | 4/2002 | Forbes et al. | |
| 6,385,767 B1 | 5/2002 | Ziebell | |
| 6,405,364 B1 | 6/2002 | Bowman-Amuah | |
| 6,418,554 B1 | 7/2002 | Delo et al. | |
| 6,418,555 B2 | 7/2002 | Mohammed | |
| 6,427,230 B1 | 7/2002 | Goiffon et al. | |
| 6,430,740 B1 | 8/2002 | Hart et al. | |
| 6,442,752 B1 | 8/2002 | Jennings et al. | |
| 6,463,583 B1 | 10/2002 | Hammond | |
| 6,484,309 B2 | 11/2002 | Nowlin et al. | |
| 6,490,723 B1 | 12/2002 | Bearden et al. | |
| 6,501,995 B1 | 12/2002 | Kinney et al. | |
| 6,606,744 B1 | 8/2003 | Mikurak | |
| 6,631,516 B1 | 10/2003 | Baumgart et al. | |
| 6,654,778 B1 | 11/2003 | Blandy et al. | |
| 6,654,932 B1 | 11/2003 | Bahrs et al. | |
| 6,662,357 B1 | 12/2003 | Bowman-Amuah | |
| 6,718,535 B1 | 4/2004 | Underwood | |
| 6,804,663 B1 | 10/2004 | Delo | |
| 6,871,345 B1 | 3/2005 | Crow et al. | |
| 6,883,168 B1 | 4/2005 | James et al. | |
| 6,922,722 B1 | 7/2005 | Mann et al. | |
| 6,990,660 B2 | 1/2006 | Mashir et al. | |
| 7,058,941 B1 | 6/2006 | Venkatesan et al. | |
| 7,080,371 B1 | 7/2006 | Arnaiz et al. | |
| 7,085,822 B1 | 8/2006 | Donatelli et al. | |
| 7,149,789 B2 | 12/2006 | Slivka et al. | |
| 7,219,332 B2 * | 5/2007 | Gouge et al. | 717/121 |

OTHER PUBLICATIONS

Template Software Corporation, Using the WFT Development Environment. version 8.0, 1998, Chapters 1-9.

Standridge. "Modular Simulation Environments: An Object Manager Based Architechture" WSC' 99 Winter Sumulation Conference Proceedings "Simulation-A Bridge to the Future", vol. 1, pp. 598-602.

Mannisto, et al. "View to Product Configuration Knowledge Modelling and Evolution" (1996), pp. 1-8.

Ambler. "The Object Primer" the Application Development Guide to Object-Orientation, Chapters 5 & 6, Jan. 6, 1996.

Grimshaw, et al. "Portable Run-Time Support for Dynamic Object-Oriented Parallel Processing" (1996) ACM, pp. 139-170.

Setup Factory, User's Guide. IndigoRose (1998) pp. 1-82.

Banick, et al. Web Management with Microsoft Visual SourceSafe 5.0 (1997) pp. 1-247.

Levine. Linker & Loaders (1999) pp. 205-222.

Horton. "Beginning Visual C++5" (1997) WROX, pp. 7-48, 267-360, 715-734.

IBM. "IBM Dictionary of Computing" (1994) p. 225.

Microsoft Press Computer Dictionary, Third Edition. (1997), p. 166.

Korgen. "Object-Oriented, Single-Source, On-Line Documents, That Update Themselves" (1996) ACM, pp. 229-237.

Merge Models. http://msdn.microsoft.com/library/psdk/msi/merg_9x9v.htm last viewed Jun. 27, 2000.

Cheshire, et al. IBM Technical Disclosure. "Dual indirect RAM/ROM JUMP Tables for Firmware Updates" (1998), 5 pages.

Office Action dated Dec. 18, 2003 cited in U.S. Appl. No. 09/770,705.

Office Action dated May 25, 2004 cited in U.S. Appl. No. 09/770,705.

Office Action dated Jan. 10, 2005 cited in U.S. Appl. No. 09/770,705.

Office Action dated Jun. 28, 2005 cited in U.S. Appl. No. 09/770,705.

Office Action dated Jun. 20, 2006 cited in U.S. Appl. No. 09/770,705.

Office Action dated Nov. 9, 2006 cited in U.S. Appl. No. 09/770,705.

Notice of Allowance dated Feb. 22, 2007 cited in U.S. Appl. No. 09/770,705.

* cited by examiner

SYSTEM AND METHOD FOR IMPORTING A CONFIGURED DATA SET INTO A TARGET SET

CROSS-REFERENCE TO RELATED APPLICATION

This application is a continuation of U.S. patent application Ser. No. 09/770,705, filed Jan. 26, 2001, and entitled SYSTEM AND METHOD FOR CONFIGURING SOFTWARE COMPONENTS, which claims the benefit of U.S. Provisional Application Ser. No. 60/216,720, filed on Jul. 7, 2000 and entitled SYSTEM AND METHOD FOR IMPORTING A CONFIGURED DATA SET INTO A TARGET SET.

TECHNICAL FIELD

The present invention relates generally to computer systems and more particularly to a system and method for configuring software components that are incorporated into computer programs.

BACKGROUND OF THE INVENTION

Computer programs generally require some customization when installed on a computer. Such computer programs can consist of several software components, each of which may need to be customized individually when incorporated into a particular program. A program into which a software component can be incorporated can be considered to be a data set. Similarly, the software component can be considered to be a data set. Thus, the process of configuring and installing a software component can be generalized as a customization of and merging of two of more data sets. A software component may in turn be incorporated into several different programs, each requiring the component to be customized differently.

Before a component can be incorporated into a data set (e.g. into a computer program) it may require configuration specific to that data set. Customizing the component prior to incorporation into a particular data set has historically been a difficult process because each component is customizable in different ways and each target data set may have different requirements. Also, mechanically changing a component has historically been difficult. Generally, the configuration options for a component are not well known to a component consumer. Also, even if the consumer knows the configuration options, the specific physical changes required to customize the component might not be known or might be difficult to implement.

Schemas and automated tools that enable the consumer to customize a component can simplify the consumer's task and reduce the possibility of customization errors. Conventionally, such an automated tool was of limited value, however, because it needed to be specifically designed for the component it was customizing and such specific redesign of the automated tool was at least as difficult as simply customizing the component by hand. Consequently, there is a need for a system and a process to automate and simplify merging of components into a data set.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and method for creating and describing a data set, referred to hereinafter as a configurable merge module. The present invention further relates to configuring a data set in the configurable merge module and merging the resulting configured data set into a target data set. In particular, the present invention relates to creating, describing and configuring software components (that are data sets) that are to be incorporated into software programs (target data sets) such that the components are self-describing. In particular, the self-describing software components can be self-describing concerning configuration possibilities for the software component.

An advantage of the present invention is that consumers of a particular software component to be incorporated into a particular application will have available substantially all data necessary to effect installation of the component as compared to having to gather disjoint data, as is often presently the situation. A practical application of the present invention is to simplify and allow automating creation of a program installation data set. The programmed computer, when performing a process dictated by the present invention, will quickly and correctly create configured modules from configurable merge modules, which facilitates program installation.

The present invention provides a schema to facilitate authoring the configurable merge module, describing the customization options for the configurable data set in the configurable merge module, presenting that configuration data to a configurable data set consumer, accepting configuration choices from the configurable data set consumer, storing and retrieving changes to be made to the configurable data set, implementing the changes in a new copy of the configurable data set and incorporating the configured data set into the target set. As used herein, the term "data set" means a computer readable collection of data elements.

The following description and the annexed drawings set forth in detail certain aspects of the invention. These aspects are indicative however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
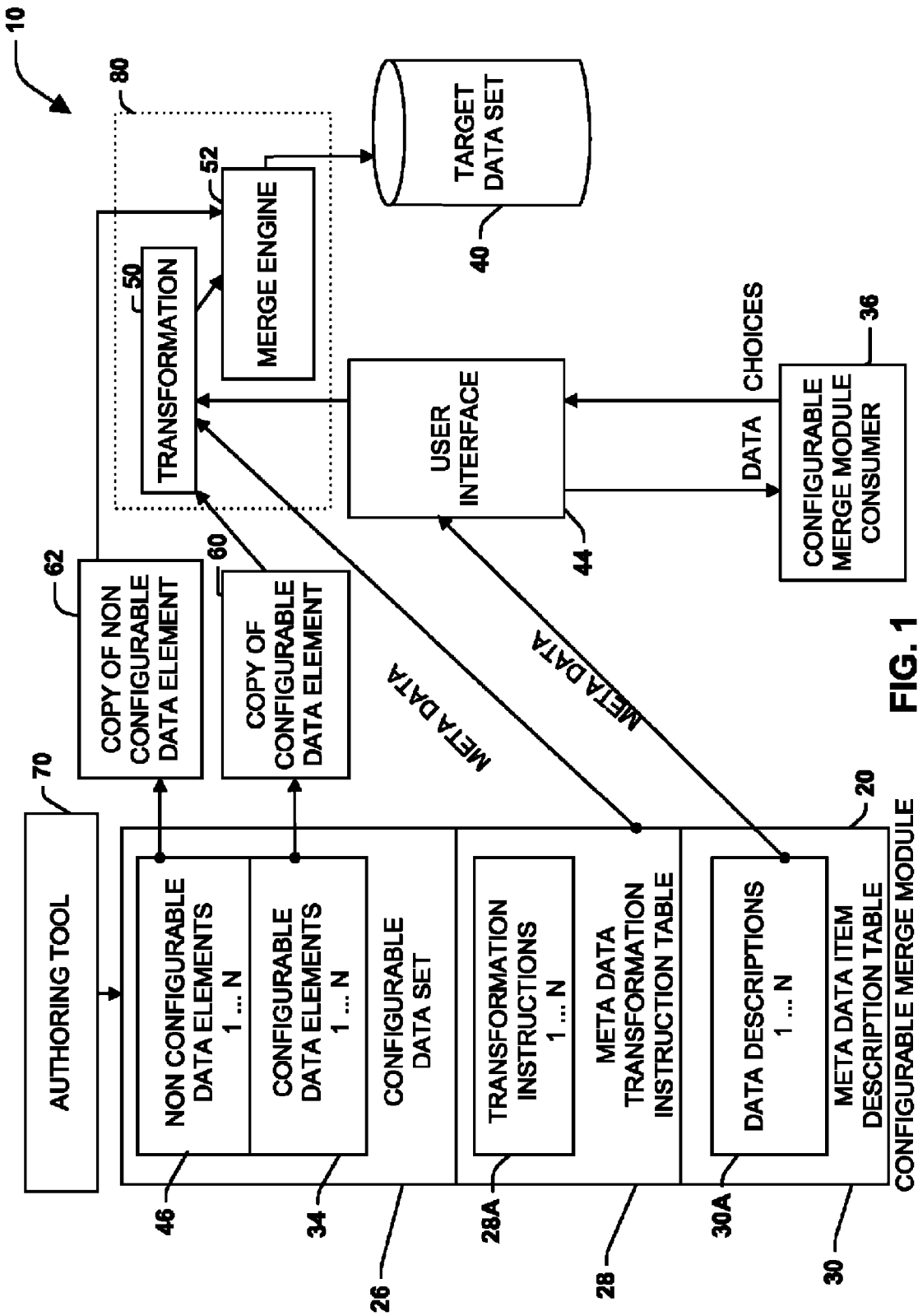
FIG. 1 is a schematic block diagram illustrating a system for configuring software modules in accordance with one aspect of the present invention.

In the following description, for purposes of explanation, numerous specific details are set forth in order to provide a thorough understanding of the present invention. It will be evident to one skilled in the art, however, that the present invention may be practiced without these specific details. In other instances, well-known structures and devices are shown in block diagram form in order to facilitate description of the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, a set of co-operating computers and/or processes and a computer.

As used in this application, the term "engine" is intended to refer to a computer-related entity, either hardware, a combination of hardware and software, software, or software in execution. By way of illustration, an engine may be, but is not limited to being, a process running on a processor, a processor, an object, an executable, a thread of execution, a program, a set of co-operating computers and/or processes and a computer. By way of further illustration, a merge engine may be a set of co-operating processes running on a set of distributed processors.

Incorporating software components into a computer program is simplified by increasing the intelligence of the software component to be merged. Such intelligence can be increased, for example, by associating the software component with a configurable merge module. The present invention includes a configurable merge module that is self-describing and that contains transformation information, thus facilitating the configuration of the software component.

The present invention provides an authoring standard to facilitate creating a self-describing configurable merge module that may, in one exemplary aspect, include a configurable data set and one or more metadata tables that describe the configurable data set and possible customizations. Information concerning the configurable data set can include a list of configurable data elements in the configurable data and the manners in which those data elements can be configured. This information can be stored, for example, in one or more metadata tables describing the configurable data set.

By way of illustration, the configurable data set may be a set of graphing objects and their installation data (e.g. possible target directories, possible user languages, possible operating system versions). The target data set may be, for example, a spreadsheet application. The present invention may, for example, produce metadata tables describing the configuration choices for the graphing objects and how to configure the graphing objects in response to a consumer's configuration choices. The present invention provides for displaying configuration choices to a developer creating a program installation data set for a spreadsheet application, and for receiving that user's configuration choices. The configurable data elements can then be processed from the configurable data set through a transformation engine that merges those configured data elements into the spreadsheet application's configuration data set so that the spreadsheet application user would then have use of the configured graphing object.

Configurable Merge Modules ("CMModules") provide a way for an Installer Merge Module ("Module"), which is a collection of one or more software components and setup data, to describe itself to both a CMModule consumer and to a CMModule transformation engine. Such description enables a CMModule consumer to make informed decisions concerning configuration. It also facilitates reliably and predictably changing setup behavior described by the CMModule. The setup changes are made possible by information and rules encoded in tables that form part of the CMModule.

For example, one table in the CMModule may describe a set of data elements that can be presented to the CMModule consumer via a user interface, the valid choices for each data element, default values for each data element and how each possible CMModule consumer choice modifies the CMModule data element. An example of a CMModule consumer is a configuring/installing programmer who desires to add a component to an application. A separate merge engine may interpret the data elements, the CMModule consumer's choices concerning those data elements and rules stored in a second table in the CMModule and at merge time dynamically modify copies of the configurable data elements before integrating the results into the CMModule consumer target data set, which in this example would be a setup file.

CMModules can consist of two or more parts. A first portion could be a schema definition that facilitates a CMModule describing which of its properties can be modified by a CMModule consumer. The schema holds and describes values available for each property including default values. The second portion could be a schema definition and corresponding data interpretation engine that applies decisions made by the CMModule consumer to the CMModule. The interpretation engine reads configuration data from the CMModule and uses a set of rules to modify other data elements inside the CMModule.

Turning now to FIG. 1, a block diagram for a system 10 for creating and describing a configurable merge module 20, configuring a data set 26 in the merge module 20 and merging the resulting configured data into a target data set 40 is illustrated. A configurable merge module 20 ("CMModule") can include the configurable data set 26, a metadata transformation instruction table 28, and a metadata item description table 30.

A row in the metadata item description table 30 may represent one or more configurable data elements 34 that can be modified by a CMModule consumer 36. By way of illustration, a row in the metadata item description table 30 may represent a user understandable logical abstraction of one or more configurable data elements that can be changed as a set. The row indicates the name of the item, defines a specific semantic meaning to that item, supplies several localizable user interface ("UI") strings describing the configurable data element 34, and provides optional help information. Entries in a metadata item description table 30 can include, but are not limited to, a name (for identifying a configurable item), a format (contributing to a semantic meaning for the item), a type (contributing to a semantic meaning for the item), context data (contributing to a semantic meaning for the item), a default value, a description (a user readable and localizable description of the item) and a set of attributes (for further describing the item).

The metadata transformation instruction table 28 can be a part of the CMModule 20. It can contain instructions for how configurable data elements 34 identified in the metadata item description table 30 may be modified at merge time, for example. Change actions are stored in the metadata transformation instruction table 28 in the CMModule 20. A row in the metadata transformation instruction table 28 defines a configurable data element 34 location in the CMModule 20 as well as a value template defining a resultant value for the location, expressed in terms of zero or more items from the metadata item description table 30 and optional literal data.

For illustrative purposes, a CMModule may consist of a plurality of tables of data arranged in rows and columns. Certain locations identified as configurable data elements in the configurable data set may need to be configured. A default value and other available values may be stored in the metadata item description table 30. A metadata transformation instruction table element 28A may specify, for example, that the configurable data element in column three of row five of a table in the configurable data set 26 should contain an integer. The integer value may be taken from the default value located in the metadata item description table 30 or from the configurable merge module consumer 36, and placed in the proper location with the proper format as controlled by the metadata transformation instruction table element 28A.

When the configurable merge module consumer 36 requests that a CMModule 20 be merged into a target data set 40, the user interface 44 can query the metadata item description table 30 to determine which data elements 46, 34 in the configurable data set 26 in the CMModule 20 can be configured. The user interface 44 communicates values from the metadata item description table 30 to the CMModule consumer 36, prompting the CMModule consumer 36 for each item in the metadata item description table 30 as required by the merge engine 52 to complete the configuration. Modifying and merging the data are accomplished by a data interpretation system 80. The data interpretation system can include a transformation engine 50 and a merge engine 52. The resulting modified data element is then merged into the target data set 40, wherein the resulting modified data element is substantially similar to data elements in the target data set 40 not processed by the present invention. When the merge is complete, CMModule consumer 36 configuration choices are discarded, and the CMModule 20 is available to be reconfigured for a different target data set 40.

To create a CMModule 20, an author can create data descriptions in the metadata item description table 30 in the CMModule 20. The descriptions can identify configurable items. The author can further define, in the metadata transformation instruction table 28, how each configurable data element 34 will be changed in response to CMModule consumer configuration choices.

The user interface 44 can expose information from the metadata item description table 30 in a manner understandable to the CMModule consumer 36. After the CMModule consumer 36 provides the user interface 44 with choices for a configurable data element 34, the transformation engine 50 changes the configurable data element 34. Based on the configurable merge module consumer 36 choices, the transformation engine 50 selects one or more transformation instructions 28A from the metadata transformation instruction table 28 and physically changes the configurable data element 34 by applying the selected transformation instructions 28A. The merge engine 52 then takes the configured data element and places it into the desired position in the target data set 40.

Figure 2:
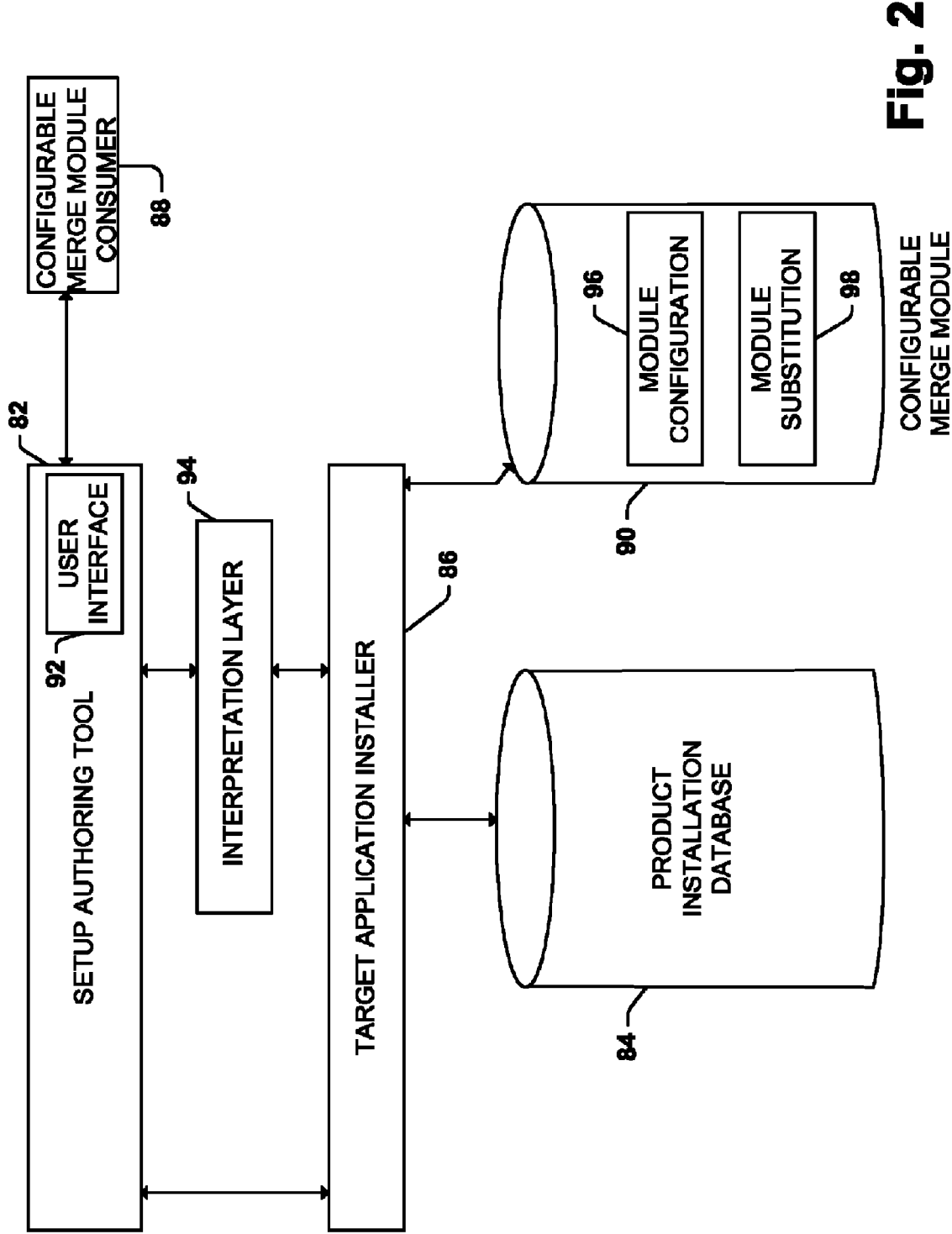
FIG. 2 is a schematic diagram illustrating a configurable merge module employed in configuring a software module in accordance with an aspect of the present invention.

Turning now to FIG. 2, a setup-authoring tool 82 is illustrated. The setup-authoring tool 82 is employed to create a product installation database 84. A target application installer 86 provides infrastructure to manage the product installation database 84. When a configurable merge module consumer 88 desires to merge a configurable merge module 90 containing additional setup data, a user interface 92 invokes an interpretation layer 94. The interpretation layer 94 communicates with the target application installer 86 to read a Module Configuration Table 96, providing a list of configuration data elements to the user interface 92. As the data elements are read from the configurable merge module 90 and placed in the product installation database 84, the interpretation layer 94 compares the data against a Module Substitution Table 98 in the configurable merge module 90. The transformation instructions in the Module Substitution Table 98 are combined with responses from the user interface 92 to modify the data element before it is written to the target data set 40 (FIG. 1).

Figure 3:
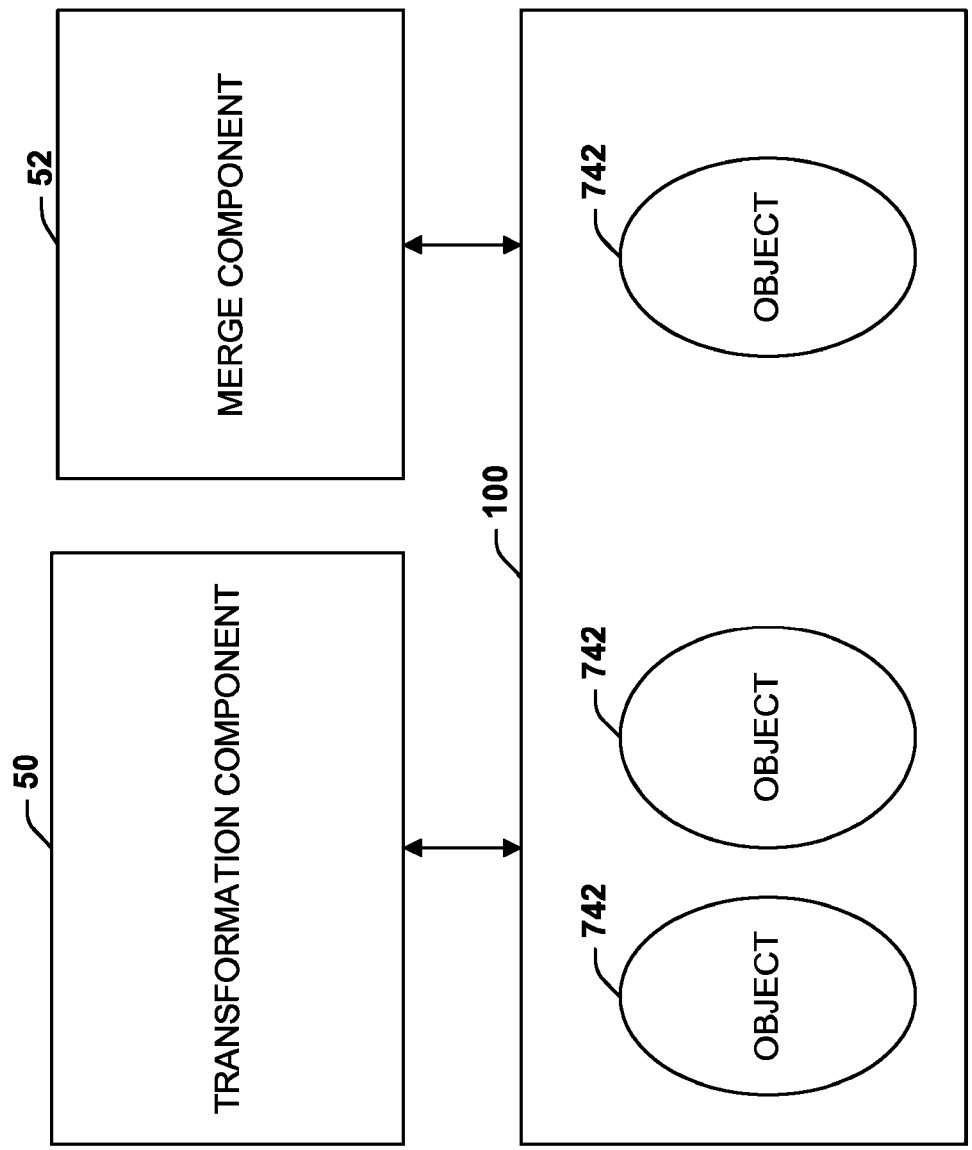
FIG. 3 is a schematic block diagram illustrating an object oriented programmatic interface to transformation and merge engines in accordance with the present invention.

Turning now to FIG. 3, an object-oriented programmatic interface 100 to the transformation engine 50 (FIG. 1) and the merge engine 52 (FIG. 1) is presented. Methods available through the object-oriented programmatic interface 100 can include, but are not limited to methods for opening, reading, writing and closing the CMModule 20 (FIG. 1), including the configurable data set 26, the metadata transformation instruction table 28 and the metadata item description table 30. The methods available through the object-oriented programmatic interface 100 can further include methods for transforming the configurable data elements 34 and merging transformed data elements into the target data set 84.

The merge engine 52 has a programmatic interface. The merge engine 52 can invoke methods of this programmatic interface to request that the transformation engine 50 provide configuration information. The CMModule 20 can be configured based on the transformation engine 50 responses to calls on the programmatic interface.

In view of the exemplary systems shown and described above, methodologies, which may be implemented in accordance with the present invention, will be better appreciated with reference to the flow diagrams of FIG. 4 through FIG. 9. While, for purposes of simplicity of explanation, the methodologies of FIG. 4 through FIG. 9 are shown and described as a series of function blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. It is to be appreciated that the various blocks may be implemented via software, hardware a combination thereof or any suitable means (e.g., device, system, process, component) for carrying out the functionality associated with the blocks. It is also to be appreciated that the blocks are merely to illustrate certain aspects of the present invention in a simplified form and that these aspects may be illustrated via lesser and/or greater number of blocks.

Figure 4:
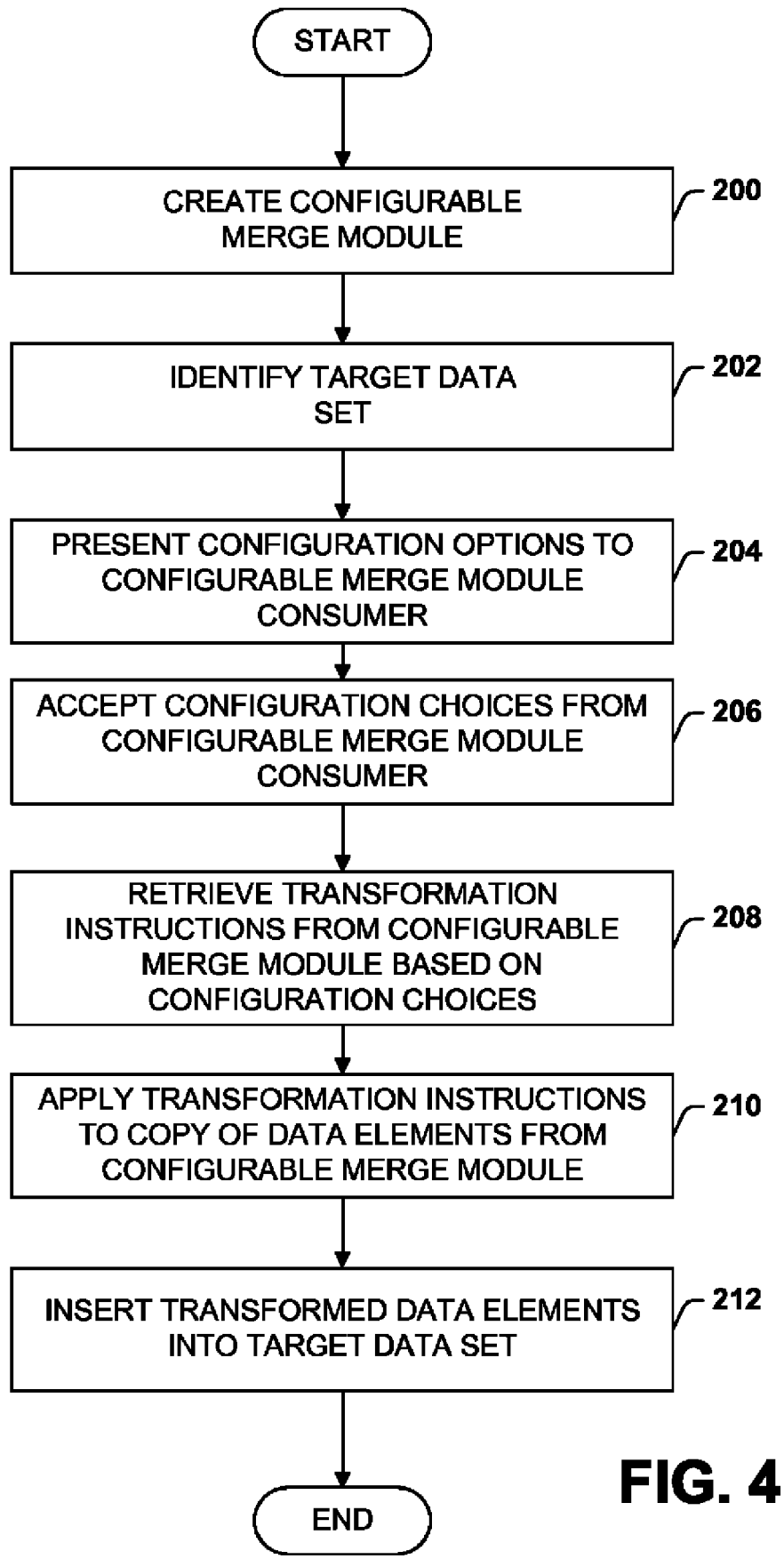
FIG. 4 is a flow diagram illustrating a process for creating and describing a configurable merge module, configuring the data set in that configurable merge module and merging the resulting configured data set into a target data set in accordance with one aspect of the present invention.
Figure 5:
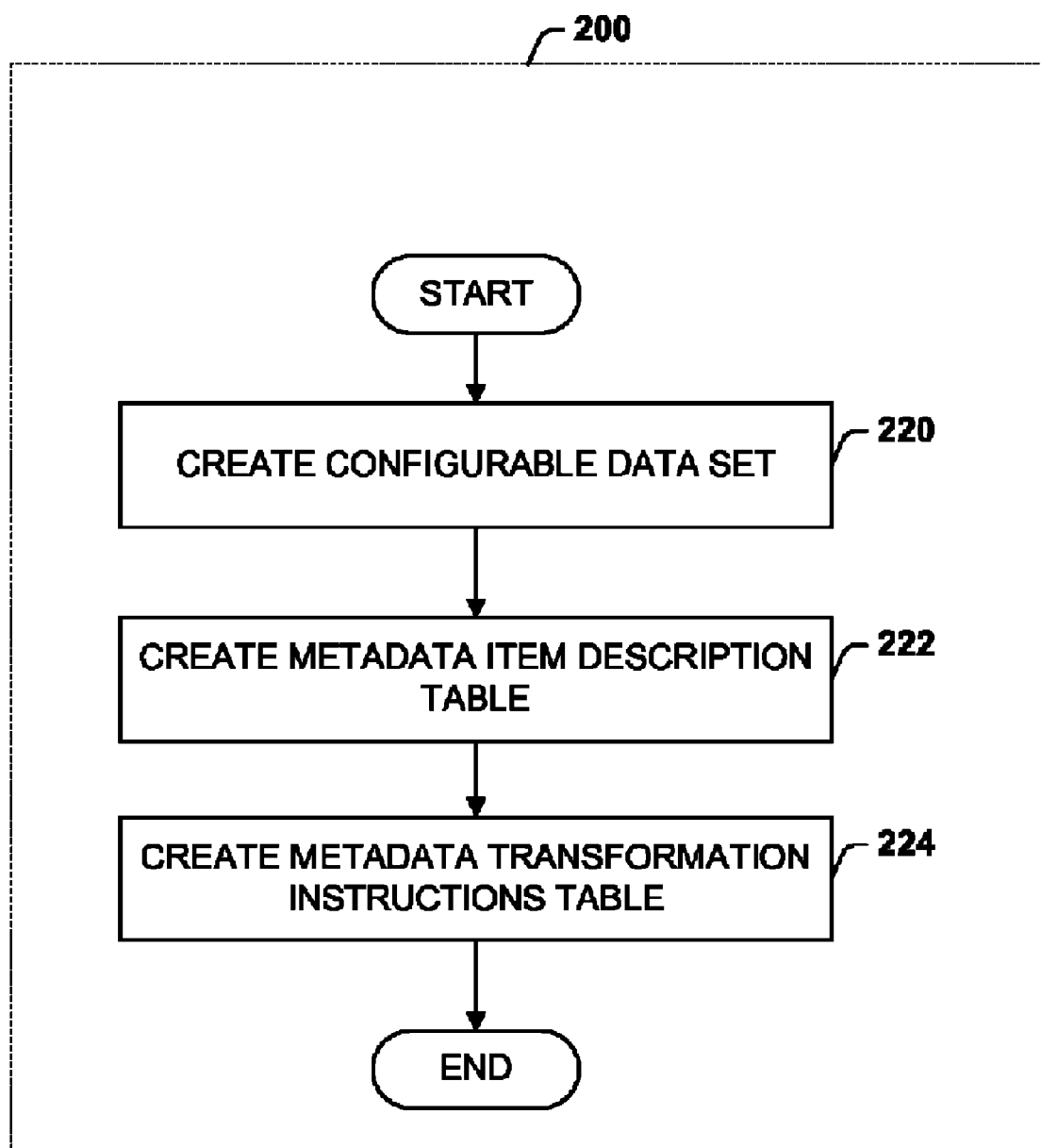
FIG. 5 is a flow diagram illustrating a methodology for creating a configurable merge module in accordance with one aspect of the present invention.

Turning now to FIG. 4, a methodology for creating and describing a configurable merge module, configuring a data set in the configurable merge module and merging the resulting configured data into a target data set is flow charted. First, at block 200 a CMModule author will create the configurable merge module ("CMModule"). By way of illustration, the CMModule may contain a software component for a code segment responsible for verifying Personal Identification Numbers (PINS) for a specified Uniform Resource Locator (URL). The CMModule code segment would have specific locations that may be customized. The instructions for how to configure the segment will go in the metadata transformation instruction table. The default and other possible values will go in the metadata item description table. Block 200 is broken down into sub blocks as illustrated in FIG. 5.

At block 202, the CMModule consumer identifies a target data set for which the CMModule consumer desires to configure the CMModule. At block 204, the user interface presents configuration options to the CMModule consumer. For example, the default URL and a default PIN may be presented to the entity configuring the module, which then selects the desired URL and the desired PIN.

At block 206 the user interface accepts configuration options from the CMModule consumer. At block 208, transformation instructions are retrieved from a metadata transformation instruction table with those specific instructions selected based on the configuration options chosen in block 206. For example, the desired URL may need to be inserted in the configurable data set in two locations as a string. Metadata transformation instructions specify how and where the data is inserted. Similarly, the desired PIN may need to be inserted at three locations as an integer. The metadata transformation instructions will again specify how and where the data is inserted.

At block 210, the transformation instructions retrieved during block 208 are applied to copies of configurable data elements from a CMModule configurable data set. At block 212, copies of the configurable data elements and copies of non-configurable data elements are merged into a target data set. For example, a program receiving the configured code segment can accept the configured code module data with the desired URL in its two places and with the desired PIN in its three places in the desired formats.

Turning now to FIG. 5, block 200 can be broken down into sub blocks. To create a configurable merge module, a CMModule author will first perform the functionality of block 220 and create a configurable data set as further detailed in FIG. 6. At block 222, a CMModule author will create a metadata item description table. Block 222 is further described below in FIG. 7. At block 224, the CMModule author will create a metadata transformation instruction table. Block 224 is further described below in FIG. 9.

Figure 6:
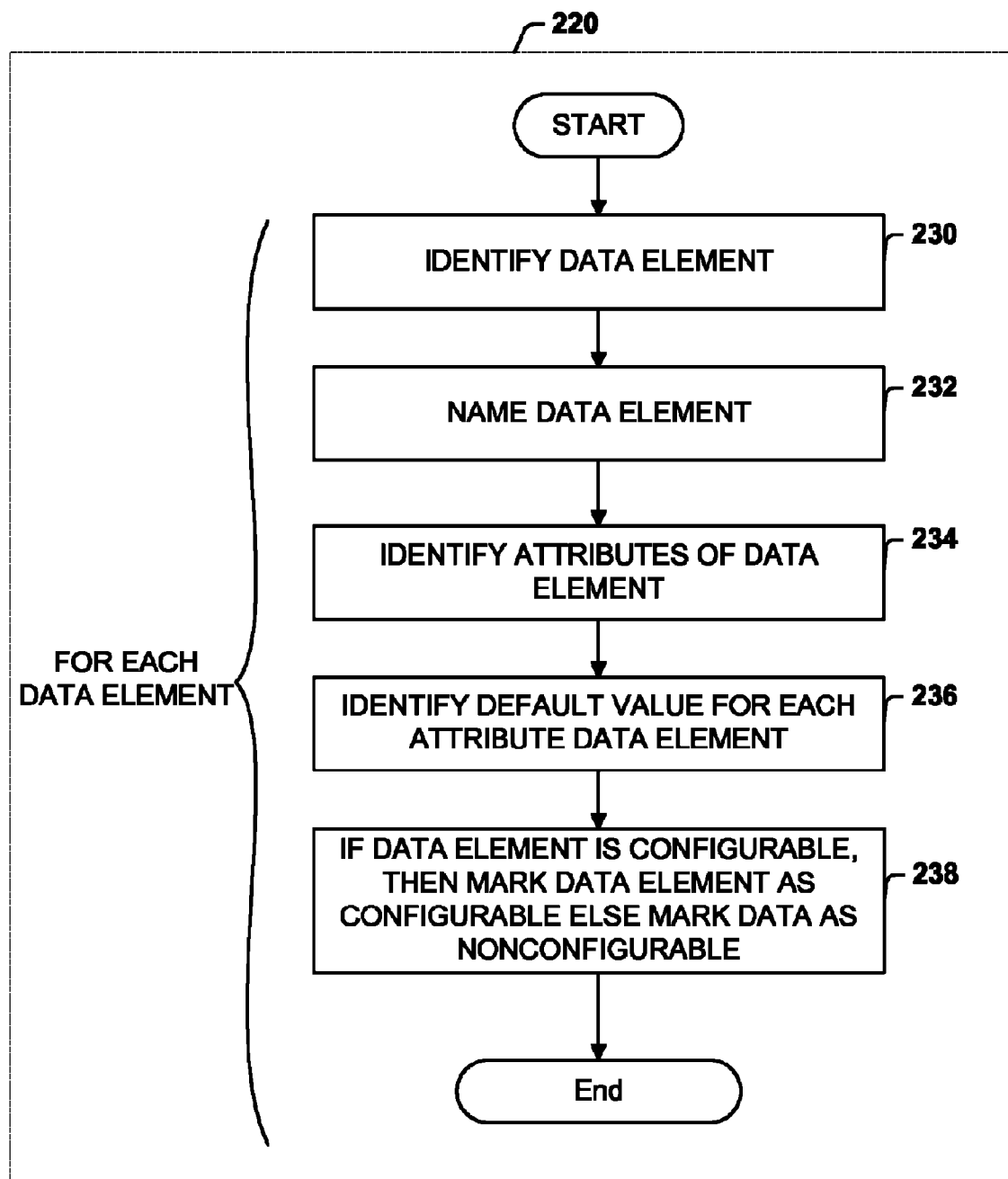
FIG. 6 is a flow diagram illustrating a methodology for creating a configurable data set in accordance with one aspect of the present invention.

Turning now to FIG. 6, block 220 can be broken down into sub blocks. To create a configurable data set the CMModule author performs blocks 230 through 238 for each data element in the configurable data set. At block 230, the CMModule author identifies a data element to be included in the configurable data set. At block 232, the CMModule author names that data element. At block 234 the CMModule author identifies the attributes of that data element. After identifying the attributes of the data element in block 234, the CMModule author will, in block 236, identify a default value for each attribute identified in block 234. At block 238, the CMModule author marks the data element as either configurable or non-configurable.

For example, a first data element identified can be the URL of a website. The first data element can be named URL, its type set to string and no default value entered. The first data element may be marked configurable. A second data element identified can be the name of a code segment. The second data element may be named NAME, its type set to string and a default value of WALDO established. The second data element can be marked non-configurable. While, for purposes of illustration, two data elements are described above, it will be understood and appreciated by those skilled in the art that a greater or lesser number of data elements can be implemented in a configurable data element, in accordance with the present invention.

Figure 7:
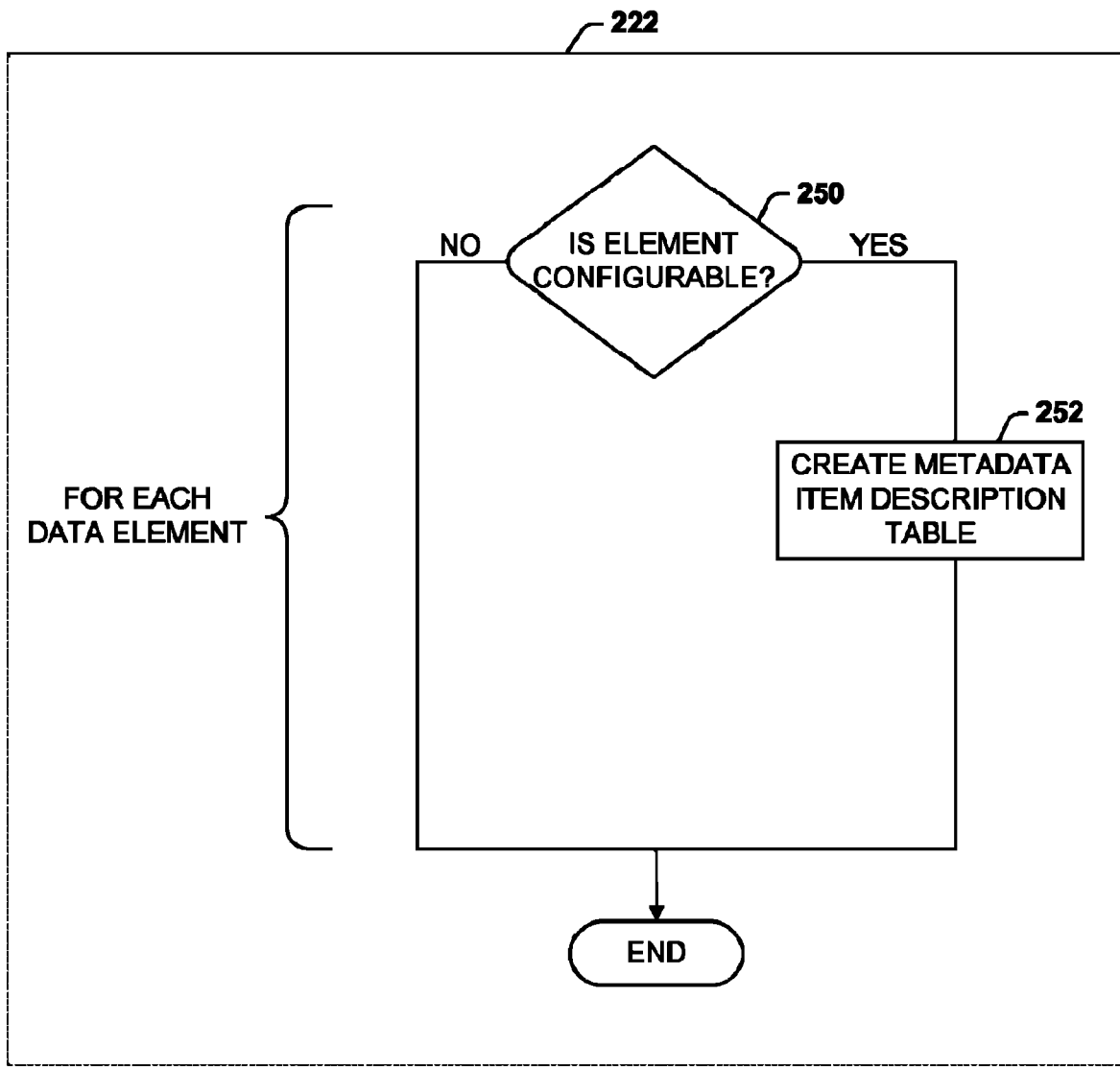
FIG. 7 is a flow diagram illustrating a methodology for creating a metadata item description table in accordance with one aspect of the present invention.

Turning now to FIG. 7, block 222 can be broken down into two other blocks. In block 250, a data element is examined to see whether it is configurable. If it is, then in block 252 a metadata item description element is created, as detailed in FIG. 8. If the data element is not configurable, then no metadata item description element is created. Blocks 250, and when appropriate 252, are performed for each data element.

Figure 8:
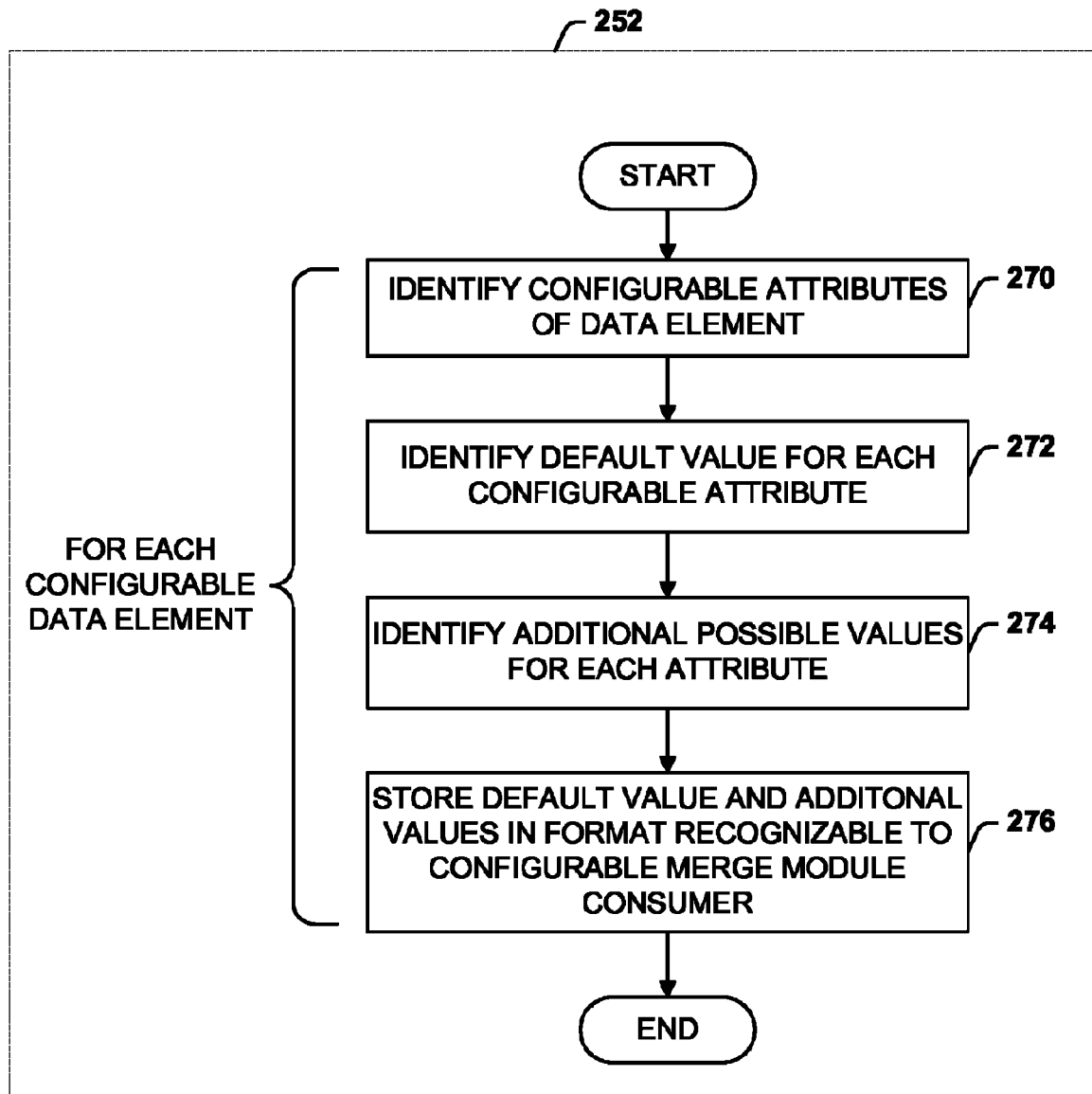
FIG. 8 is a flow diagram illustrating a methodology for creating a metadata item description element in accordance with one aspect of the present invention.

Turning now to FIG. 8, block 252 can be broken down into sub blocks. For each configurable data element identified in block 252, blocks 270 through 276 are performed. At block 270, the configurable attributes of the configurable data element are identified. At block 272, the default value for the configurable attribute is identified. At block 274, additional possible values for each attribute are identified. At block 276, the default value for the attribute and the additional possible values for the attribute are stored in a format recognizable to a CMModule consumer. For example, the configurable attributes of the URL data element can be identified. Then a default value for that data element can be entered. Next, additional possible values can be stored in the metadata item description element. Then, a CMModule consumer readable version of the attributes that can be presented to the consumer are stored in the metadata item description table.

Figure 9:
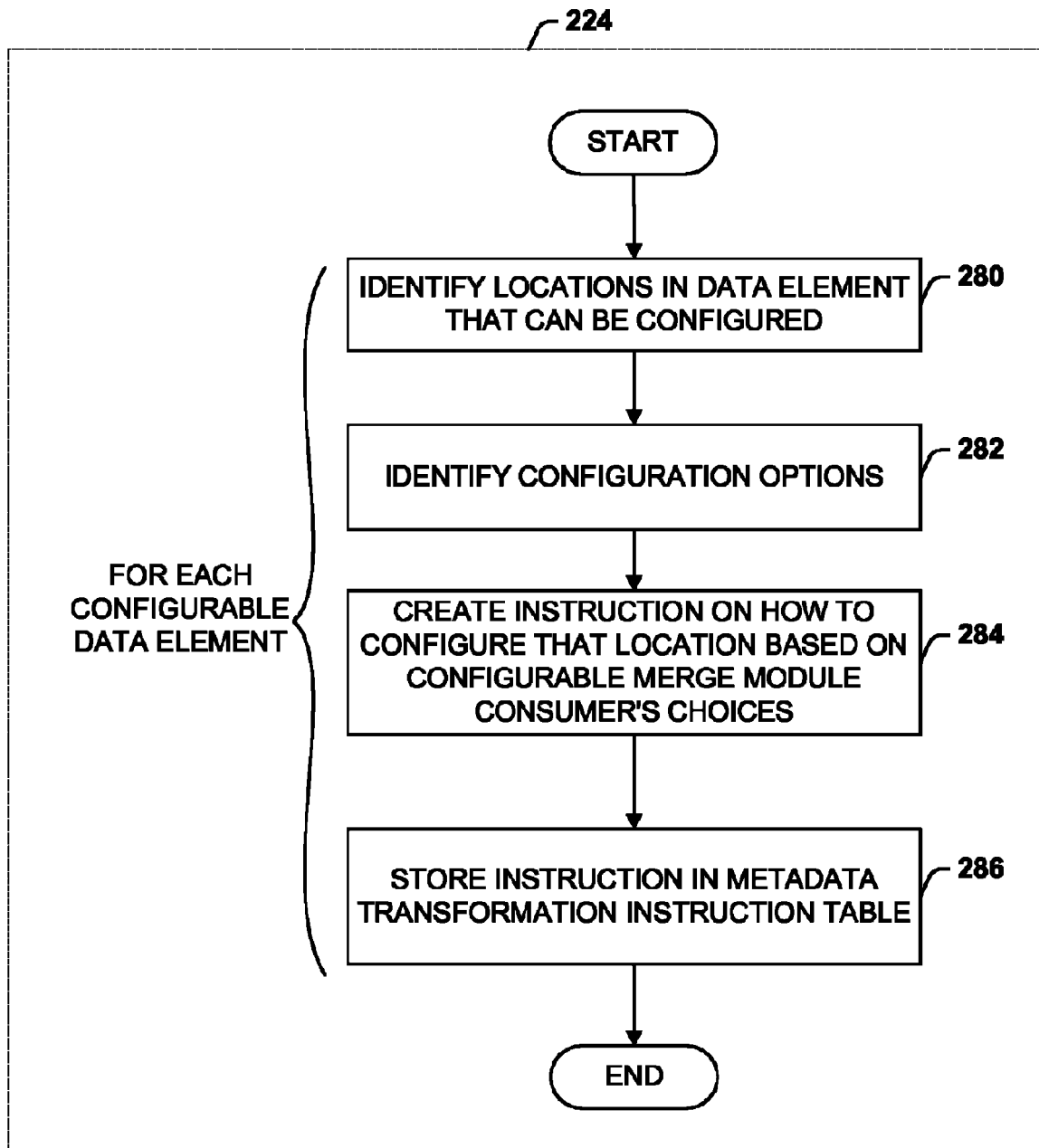
FIG. 9 is a flow diagram illustrating a methodology for creating a metadata transformation instruction table in accordance with one aspect of the present invention.

Turning now to FIG. 9, block 224 can be broken down into sub blocks. To create the metadata transformation instruction table as illustrated in block 224, blocks 280 through 286 are performed for each configurable data element in a configurable data set. At block 280, the physical locations in the configurable data element that can be configured are identified. At block 282, the possible configuration options for those physical locations are identified. At block 284, instructions on how to perform the physical configuration of the physical locations based on the CMModule consumer's choices are created. At block 286, the physical configuration instructions are stored in the metadata transformation instruction table.

Figure 10:
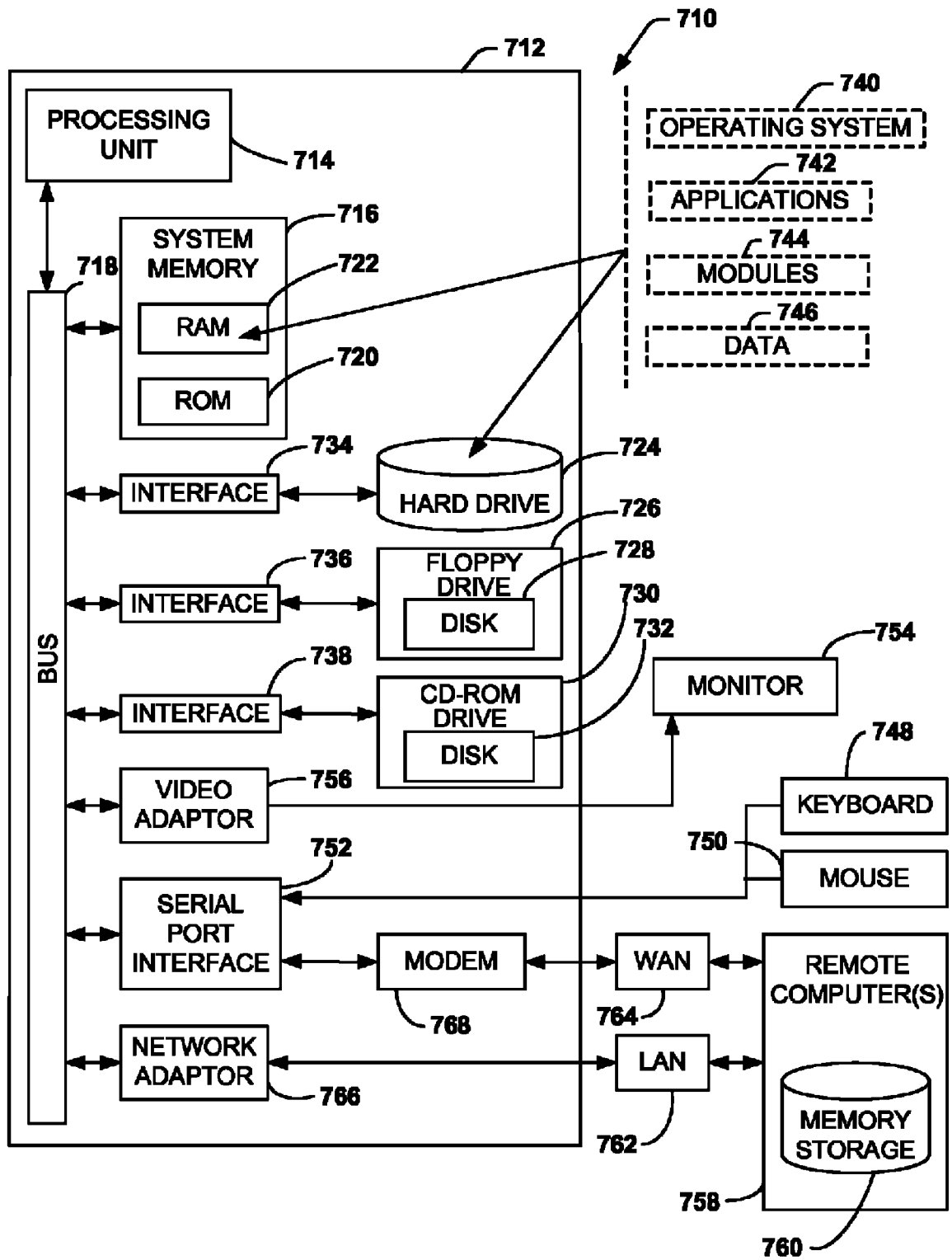
FIG. 10 is a block diagram of an exemplary operating environment for a system configured in accordance with the present invention.

In order to provide additional context for various aspects of the present invention, FIG. 10 and the following discussion are intended to provide a brief, general description of a suitable computing environment 710 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks may be employed.

With reference to FIG. 10, an exemplary environment 710 for implementing various aspects of the invention includes a computer 712, including a processing unit 714, a system memory 716, and a system bus 718 that couples various system components including the system memory to the processing unit 714. The processing unit 714 may be any of various commercially available processors. Dual microprocessors and other multi-processor architectures also can be used as the processing unit 714.

The system bus 718 may be any of several types of bus structure including a memory bus or memory controller, a peripheral bus, and a local bus using any of a variety of commercially available bus architectures. The computer 712 memory includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program data 746. The operating system 740 may be any of various commercially available operating systems.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance, a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the computer 712 or remote computer(s) 758, unless otherwise indicated. Such acts and operations are sometimes referred to as being computer-executed. It will be appreciated that the acts and symbolically represented operations include the manipulation by the processing unit 714 of electrical signals representing data bits which causes a resulting transformation or reduction of the electrical signal representation, and the maintenance of data bits at memory locations in the memory system (including the system memory 716, hard drive 724, floppy disks 728, CD-ROM 732) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as utilized as a transitional word in a claim.

What is claimed is:

1. A computer implemented method, which is implemented by a computer system having at least one processor, that installs a configurable data set into a target data set, comprising:
   extracting transformation instructions from a configurable module;
   replicating configurable and non-configurable data elements from the configuration module;
   configuring the replicated data elements with the transformation instructions; and
   installing the configured data elements into a target data set.

2. The method of claim 1, the configuring includes applying the transformation instruction to the replicated data elements.

3. The method of claim 1, wherein the method further includes locating the data set and updating data elements currently associated with the target data set with the replicated data elements.

4. The method of claim 1, wherein the method further includes presenting configuration options to a user.

5. The method of claim 1, wherein the method further includes utilizing configuration options from a user.

6. The method of claim 1, wherein the configuring of the replicated data elements is based at least in part on configuration selections made by a user configuring the data elements.

7. The method of claim 1, wherein the method further comprising identifying a configurable location within the target set.

8. The method of claim 7, wherein the method generating instructions concerning how to configure the configurable location.

9. The method of claim 8, wherein the method persisting the instructions in a metadata tables associated with a configurable module.

10. A computing system that includes at least one processor and which installs software, comprising:
    means for extracting data elements and transformation instructions from a configurable module; and
    means for copying the data elements, utilizing the transformation instructions to configure the copied data elements, and incorporating the configured data elements into a target module associated with the software, where the data elements include configurable and non-configurable data elements.

11. The system of claim 10, wherein the transformation instructions are persisted in a metadata table associated with the configurable module.

12. The system of claim 10, wherein the data elements are persisted in a metadata table associated with the configurable module.

13. The system of claim 12, wherein the metadata table includes row that include user understandable logical abstractions of the configurable data elements that can be modified as a set.

14. The system of claim 10, wherein the system further includes an interface that enables users to interrogate a configurable module to determine which of the configurable data elements and non-configurable data elements are configurable.

15. The system of claim 14, wherein the configurable module includes indications on permissible customizations with regard to the configurable data elements.

16. The system of claim 10, the wherein configurable data elements include an indication of possible target directories, user languages, or operating system versions.

17. The system of claim 10, wherein the non-configurable data elements include valid choices or default values for each configurable data element.

18. The system of claim 10, further comprising:
    means for identifying the target module; and
    means for presenting and receiving configuration options from a user.

* * * * *